United States Patent Office 3,846,283
Patented Nov. 5, 1974

3,846,283
BIMETALLIC CATALYTIC REFORMING WITH HALOGEN ADDITION
Richard E. Rausch, Mundelein, Ill., assignor to Universal Oil Products Company, Des Plaines, Ill.
No Drawing. Continuation-in-part of application Ser. No. 201,576, Nov. 23, 1971, which is a continuation-in-part of application Ser. No. 807,910, Mar. 17, 1969, now Patent No. 3,740,328. This application July 5, 1973, Ser. No. 376,841
The term of this patent subsequent to July 10, 1990, has been disclaimed
Int. Cl. C10g 35/08
U.S. Cl. 208—139     18 Claims

ABSTRACT OF THE DISCLOSURE

A gasoline fraction is catalytically reformed by contacting the gasoline fraction, hydrogen and a halogen additive at reforming conditions with an improved bimetallic catalyst, comprising a combination of a plantinum group component, a tin component and a halogen component with a porous carrier material. Key features of the present process are: (1) use of a halogen additive in an amount of about 0.1 to 100 wt. p.p.m. of the gasoline fraction; (2) maintenance of substantially all of the platinum group component of the catalyst in the elemental metalic state; (3) operation with substantially all of the tin component of the catalyst in a positive oxidation state; and, (4) maintenance of the tin component of the catalyst in a uniformly dispersed and relatively small particle size state.

CROSS-REFERENCES TO RELATED APPLICATIONS

This application is a continuation-in-part of my prior, copending application Ser. No. 201,576 which was filed on Nov. 23, 1971 now Pat. 3,745,112 which in turn is a continuation-in-part of my prior application Ser. No. 807,910 which was filed on Mar. 17, 1969 and issued on June 19, 1973 as U.S. Pat. No. 3,740,328, all of the teachings of these prior applications being specifically incorporated herein by reference.

DISCLOSURE

The subject of the present invention is an improvement in a catalytic reforming process in which a relatively low octane gasoline fraction is contacted with an improved bimetallic catalyst at reforming conditions. This improved bimetallic catalyst is a combination of catalytically effective amounts of a platinum group component, a tin component and a halogen component with a porous carrier in a manner such that (1) the tin component is uniformly dispersed in the carrier material in a relatively small particle size; (2) substantially all of the platinum group is present as the elemental metal; and, (3) substantially all of the tin component is present in an oxidation state above that of the elemental metal. The improvement of the present invention comprises continuous addition of a halogen additive to this reforming process in an amount corresponding to that 0.1 to about 100 wt. p.p.m. of the gasoline fraction. The principal advantages associated with this improved mode of operation are increased activity- and selectivity-stability of the bimetallic catalyst, increased average octane number of product reformate and increased catalyst life.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversions reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5^+$ product stream; selectivity usually refers to the amount of $C_5^+$ yield that is obtained relative to the amount of the charge at the particular activity or severity level; and stability is typically equated to the rate of change with time of activity, as measured by octane number of $C_5^+$ product and of selectivity, as measured by $C_5^+$ yield. Actually, the last statement is not strictly correct because generally a continuous reforming process is run to produce a constant octane $C_5^+$ product with a severity level being continuously adjusted to attain this result; and, furthermore, the severity level is for this process usually varied by adjusting the conversion temperature in the reaction zone so that in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5^+$ yield-octane relationship—$C_5^+$ yield being representative of selectivity, and octane being proportional to activity.

In my prior applications, I disclosed a dual-function bimetallic catalytic composite which possessed improved activity, selectivity, and stability when it is employed in a process for the conversion of hydrocarbons of the type which have heretofore utilized dual-function catalytic composites such as processes for isomerization, hydroisomerization, dehydrogenation, resulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I have previously indicated that a bimetallic catalyst, comprising a combination of catalytically effective amounts of a platinum group component, a tin component, and a halogen component with a porous refractory carrier material, can enable the performance of a hydrocarbon conversion process, of the type which has traditionally utilized a dual-function platinum-containing catalyst, to be substantially improved, if the catalyst is prepared in a manner which insures that substantially all of the platinum group component is present therein as the elemental metal and that substantially all of the tin component is uniformly dispersed therein in an oxidation state above that of the elemental metal and in a relatively small particle size. More specifically, one of the essential conditions associated with the acquisition of this improved performance is the oxidation state of the tin component utilized in this catalyst. My finding was that the tin component must be utilized in a positive oxidation state (i.e., either +2 or +4). Also I found that the tin component should be uniformly distributed throughout the porous carrier material in a particle size which is less than 100 Angstroms in maximum dimension. In order to achieve the desired oxidation state and distribution of the tin component in this catalyst, I have established that the presence of a halogen component in the composite and the preparation of the catalyst under carefully controlled conditions (as will be explained hereinafter) are essential.

In the case of a reforming process, one of the principal advantages associated with the use of this improved bimetallic catalyst involved the acquisition of the capability to operate in a stable manner in a high-severity operation; for example, a continuous reforming process producing a $C_5^+$ reformate having an octane of about 100 F–1 clear and utilizing a relatively low pressure selected from the range of about 50 to about 350 p.s.i.g. Now as a result of further experiments, I have established that the performance of such a reforming process can be further improved by the continuous use of a halogen additive in an amount hereinafter specified. In particular, I have ascertained that continuous halogen addition in a reforming process using this improved bimetallic catalyst can produce substantially increased selectivity- and activity-stability characteristics for this bimetallic catalyst. This in turn implies the following benefits: (1) increased average octane number of product reformate, (2) increased catalyst life before regeneration becomes necessary and (3) increased average yield of $C_5^+$ reformate and hydrogen.

It is, accordingly, an object of the present invention to provide improvements in a process for the catalytic reforming of a gasoline fraction with a bimetallic catalyst comprising a combination of catalytically effective amounts of a platinum group component, a tin component and a halogen component with a porous carrier material in a manner such that substantially all of the platinum group component is present as the elemental metal and substantially all of the tin component is uniformly dispersed therein in an oxidation state above that of the elemental metal and in a relatively small particle size. Another object is to provide a procedure for maintaining at a high level the activity and selectivity characteristics of the bimetallic catalyst used in such a reforming process.

Against this background, the present invention is, in one embodiment, a process for catalytically reforming a gasoline fraction, which comprises introducing the gasoline fraction, hydrogen and a halogen additive into a reforming zone and therein contacting the resulting mixture with a unique type of bimetallic catalyst at reforming conditions. This bimetallic catalyst is a combination of a platinum group component, a tin component and a halogen component with a porous carrier material in amounts sufficient to result in the catalyst containing, on an elemental basis, about 0.01 to about 2 wt. percent platinum group metal, about 0.01 to about 5 wt. percent tin and about 0.1 to about 3.5 wt. percent halogen. Moreover, the bimetallic catalyst has substantially all of the platinum group component present as the elemental metal and substantially all of the tin component uniformly dispersed therein in an oxidation state above that of the elemental metal and in a particle size which is less than 100 Angstroms in maximum dimension.

Another embodiment relates to such a process wherein the halogen additive is a decomposable, halogen-containing compound.

Yet another embodiment involves the process described above wherein the halogen additive is used in an amount corresponding to about 0.1 to about 100 wt. p.p.m. of the gasoline fraction.

Still another embodiment involves the process described above wherein the halogen component of the catalyst is chlorine or a compound of chlorine, the platinum group component is platinum and the porous carrier material is alumina.

In a preferred embodiment, the present invention is a process as first described above wherein the halogen additive is an alkyl halide.

Other objects and embodiments of the present invention relate to additional details regarding preferred halogen additives, catalytic ingredients, amounts of ingredients, suitable methods of catalyst preparation, operating conditions for use in the reforming process, and the like particulars. These are hereinafter given in the following detailed discussion of each of these facets of the present invention.

The improved bimetallic catalyst used in the present invention comprises a porous carrier material or support having combined therewith catalytically effective amounts of a platinum group component, a tin component and a halogen component. Considering first the porous carrier material, it is preferred that the material be a porous, adsorptive, high surface area support having a surface area of about 25 to about 500 m.²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occurring, which may or may not be acid treated; for example, attapulgus clay, china clay, diatomaceous earth, fuller's earth, kaoline, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) zeolitic crystalline alumino silicates such as naturally occurring or synthetically prepared mordenite and/or faujasite, either in the hydrogen form or in a form which has been treated with multi-valent cations; and, (6) combinations of one or more elements from one or more of these groups. The preferred porous carrier materials for use in the present invention are refractory inorganic oxides with best results obtained with an alumina carrier material. Suitable alumina materials are the crystalline aluminas known as the gamma-, eta-, and theta-alumina, with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g./cc. and surface area characteristics such that the average pore diameter is about 20 to 300 Angstroms, the pore volume is about 0.1 to about 1 cc./g. and the surface area is about 100 to about 500 m.²/g. In general, best results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 cc./g., and a surface area of about 175 m.²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by way of the techniques taught in the art and preferably by reacting aluminum metal with hydrochloric acid, combining the hydrosol with a suitable gelling agent and dropping the resultant mixture into an oil bath maintained at elevated temperatures. The droplets of mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the improved bimetallic composite used in the present invention is a tin component, and it is an essential feature of the present invention that substantially all of the tin component in the composite is in an oxidation state above that of the elemental metal. That is, it is believed that best results are obtained when substantially all of the tin component exists in the catalytic composite in the +2 or +4 oxidation state. Accordingly, the tin component will be present in the composite as a chemical compound such as the oxide, sulfide, halide, oxyhalide, oxysulfide and the like wherein the tin moiety is in a positive oxidation state, or in chemical combination with the carrier material in a manner such that the tin component is in a positive oxidation state. Controlled reduction experiments with the catalytic composites produced by the preferred methods of preparing the instant catalytic composite have established that the tin component in these catalysts is in a positive oxidation state and is not reduced by contact with hydrogen at temperatures in the range of 1000 to 1200° F. It is important to note that this limitation on the oxidation state of the tin component requires extreme care in preparation and use of the present catalysts to insure that it is not subjected to a reducing atmosphere at temperatures above 1200° F. Equally significant is my observation that it is only when the tin component is in a uniformly dispersed state in the carrier material that it has the capability to maintain its positive oxidation state when subjected to hereinafter described prereduction step. Stated another way, if the tin component is not properly dispersed on the support it can be reduced in the prereduction step and result in an inferior catalyst. Based on the evidence currently available it is believed that best results are obtained when the tin component is present in the catalyst as tin oxide. The term "tin oxide" as used herein refers to a coordinated tin-oxygen complex which is not necessarily stoichiometric.

Interrelated with this oxidation state limitation are the factors of dispersion of the tin component in the support and of particle size of the tin component. This interrelationship emanates from my observation that it is only when the tin component is uniformly dispersed throughout the carrier material in a particle size having a maximum dimension less than 100 Angstroms that it can successfully maintain its preferred oxidation state when it is subjected to a high temperature prereduction treatment as hereinafter described. Thus it is an essential feature of my invention that the catalytic composite is prepared in a manner selected to meet the stated particle size and uniform dispersion limitations. By the use of the expression "uniform dispersion of the tin component in the carrier material" it is intended to describe the situation where the concentration of the tin ingredient is approximately the same in any divisable portion of the carrier material. Similarly, the expression "particles having a maximum dimension less than 100° A. is intended to denote particles that would pass through a sieve having a 100° A. mesh size if it were possible to make such a sieve.

The tin component may be incorporated into the catalytic composite in any suitable manner known to effectively disperse this component throughout the carrier material in the required particle size. Thus this component may be added to the carrier by a coprecipitation or cogellation of a suitable soluble tin salt with the carrier material, by ion-exchange of suitable tin ions with ions contained in the carrier material when the ion exchange sites are uniformly distributed throughout the carrier or controlled impregnation of the carrier material with a suitable soluble tin salt under conditions selected to result in penetration of all sections of the carrier material by the tin component. One preferred method of incorporating the tin component involves coprecipitating it during the preparation of the preferred carrier material, alumina. This method typically involves the addition of a suitable soluble tin compound such as stannous or stannic chloride to an alumina hydrosol, mixing these ingredients to obtain a uniform distribution of the tin moiety throughout the sol and then combining the hydrosol with a suitable gelling agent and dropping the resulting mixture into an oil bath etc., as explained in detail hereinbefore. After drying and calcining the resulting gelled carrier material there is obtained an intimate combination of alumina and tin oxide having the required dispersion and particle size. Another preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold the tin moiety in solution until it is evenly distributed throughout the carrier material and is preferably an aqueous, rather strongly acidic solution. Thus the tin component may be added to the carrier material by commingling the latter with an aqueous, acidic solution of suitable tin salt or suitable compound of tin such as stannous bromide, stannous chloride, stannic chloride, stannic chloride pentahydrate, stannic chloride diamine, stannic trichloride bromide, stannic chromate, stannous fluoride, stannic fluoride, stannic iodide, stannic sulfate, stannic tartrate and the like compounds. The acid used in the impregnation solution may be any organic or inorganic acid that is capable of maintaining the pH of the impregnation solution in the range of about −1 or less to about 3 and preferably less than 1 during the impregnation step and that does not contaminate the resultant catalyst. Suitable acids are: inorganic acids such as hydrochloric acid, nitric acid, and the like; and strongly acidic organic acids such as oxalic acid, malonic acid, citric acid and the like. A particularly preferred impregnation solution comprises stannic or stannous chloride dissolved in a hydrochloric acid solution containing HCl in an amount corresponding to at least about 5 wt. percent of the carrier material which is to be impregnated. Another useful impregnation solution is stannous or stannic chloride dissolved in an anhydrous alcohol such as ethanol. In general, the tin component can be incorporated either prior to, simultaneously with, or after the platinum group component is added to the carrier material. However, I have found that excellent results are obtained when the tin component is incorporated simultaneously with the platinum group component. In fact, I have determined that a preferred aqueous impregnation solution contains chloroplatinic acid, a relatively high amount of hydrogen chloride, and stannic or stannous chloride.

Regardless of which tin compound is used in the prefered impregnation step, it is essential that the tin component be uniformly distributed throughout the carrier material. In order to achieve this objective with an aqueous impregnation solution it is necessary to dilute the impregnation solution to a volume which is approximately equal or substantially in excess of the volume of the carrier material which is impregnated and to add a relatively strong acid such as hydrochloric acid, nitric acid and the like to the impregnation solution in an amount calculated to maintain the pH of the impregnation solution in a range about −1 or less to about 3, preferably less than 1. It is preferred to use a volume ratio of impregnation solution to carrier material of at least 0.5:1 and preferably about 1:1 to about 10:1 or more. Similarly, it is preferred to use a relatively long contact time during the impregation step ranging from about ¼ hour up to about ½ hour or more before drying to remove excess solvent in order to insure a high dispersion of the tin component into the carrier material. The carrier material is, likewise, preferably constantly agitated during this preferred impregnation step.

This improved bimetallic catalyst also contains a platinum component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, oxyhalide, oxysulfide, etc., or as an elemental metal or in combination with one or more of the other ingredients of the catalyst. From the evidence currently available it is believed that best results are obtained with this catalyst when substantially all of the platinum group component exists therein in the elemental state and the hereinafter described prereduction step is believed to accomplish this objective. Generally, the amount of the platinum group component present in the final catalyst is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal, although good results are also obtained when it is palladium metal or iridium metal.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic, chloroiridic or chloropalladic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyldichloride, dinitrodiaminoplatinum, paladium dichloride, palladium nitrate, palladium sulfate, etc. The utilization of a platinum group compound containing halogen, such as chloroplatinic or chloropalladic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and to aid in the distribution of the platinum group component throughout the carrier material. In addition it is generally preferred to impregnate the carrier material after it has been calcined in order ot minimize the risk of washing away the valuable platinum metal compounds; however, in some cases it may be advantageous to impregnate the carrier material when it is in a gelled state.

Another essential constituent of the improved bimetallic catalyst is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. chloride or fluoride). This combined halogen may be either fluorine, chlorine, iodine, bromine, or mixtures thereof. Of these, fluorine, and, particularly, chlorine are preferred. The halogen may be added to the carrier material in any suitable manner either during preparation of the carrier material or before or after the addition of the other components. For example, the halogen may be added at any stage of the preparation of the carrier material or to the calcined carier material as an aqueous solution of a suitable water-soluble halogen-containing compound such as hydrogen fluoride, hydrogen chloride, hydrogen bromide, ammonium chloride etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. percent and preferably about 0.5 to about 1.5 percent by weight of the halogen calculated on an elemental basis. The preferred halogen component is chlorine or a compound of chlorine.

Regarding the amount of the tin component contained in the improved composite, it is preferably sufficient to constitute about 0.01 to about 5 wt. percent of the final composite, calculated on an elemental basis, although substantially higher amounts of tin may be utilized in some cases. Best results are typically obtained with about 0.1 to about 1 wt. percent tin. Irrespective of the absolute amounts of the tin component and the platinum group component utilized, the atomic ratio of tin to the platinum group metal contained in the bimetallic catalyst is preferably selected from the range of about 0.1:1 to about 3:1, with best results achieved at an atomic ratio of about 0.5:1 to 1.5:1. This is particularly true when the total content of the tin component plus the platinum group component in the catalytic composite is fixed in the range of about 0.15 to about 2 wt. percent thereof, calculated on an elemental tin and platinum group metal basis.

Regardless of the details of how the components of the bimetallic catalyst are combined with the porous carrier material, the final catalyst generally will be dried at a temperature of about 200 to about 600° F. for a period of about 2 to about 24 hours or more, and finally calcined or oxidized at a temperature of about 700° F. to about 1100° F. in an air atmosphere for a period of at least about 0.5 to about 10 hours in order to convert substantially all of the metallic components to the oxide form. Best results are generally obtained when the halogen content of the catalyst is adjusted during the oxidation step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is essential that the resultant oxidized catalytic composite be subjected to a reduction step with a substantially water-free reduction agent prior to its use in the conversion of hydrocarbons. This step is designed to selectively reduce the platinum component and to insure a uniform and finely divided dispersion of the metallic components throughout the carrier material. Preferably, substantially pure and dry hydrogen (i.e., less than 20 vol. p.p.m. $H_2O$) is used as the reducing agent in this step. A stream of the reducing agent is contacted with the oxidized catalyst at conditions, including a temperature of about 600° F. to about 1200° F., a gas hourly space velocity of about 100 to 1000 or more hr.$^{-1}$, and for a period of about 0.5 to 10 hours, selected to reduce substantially all of the platinum group component to the metallic state while maintaining substantially all of the tin component in an oxidized state. This reduction step may be performed in situ as part of a startup sequence if precautions are taken to predry the plant to a substantially water-free state and if substantially water-free hydrogen is used. Preferably at least the initial portion of the reduction is done slowly (i.e., at lower temperatures) in order to minimize the adverse effects of the water formed by the reduction reaction.

The resulting reduced catalytic composite may, in some cases, be beneficially subjected to a presulfiding step designed to incorporate in the catalytic composite from about 0.05 to about 0.5 wt. percent sulfur calculated on an elemental basis. Preferably, this presulfiding treatment takes place in the presence of hydrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a mixture of a hydrocarbon charge stock, a halogen additive and a hydrogen stream are contacted with the improved bimetallic catalyst described hereinbefore in a hydrocarbon conversion zone maintained at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is usually preferred to use a fixed bed system. In this system, a hydrogen-rich gas, a halogen additive and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case of a reforming operation, the reforming system will comprise a reforming zone containing a fixed bed of the improved bimetallic catalyst previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom, and to saturate any olefins that may be contained therein.

It is an essential feature of the present invention that a halogen additive is admixed with the hydrocarbon charge stock and the hydrogen stream, and the resulting mixture is thereafter contacted with the improved bimetallic catalyst. The introduction of the halogen additive into the reforming zone can be accomplished by means of the hydrocarbon stream or the hydrogen stream or independently of either of these streams. The preferred procedure is to add the halogen additive to the hydrocarbon stream. In any case, the amount of halogen additive used will be sufficient to result in the total amount of halogen entering the reforming zone from any source being held in the range corresponding to about 0.1 to about 100 wt. p.p.m. of the hydrocarbon charge stock, with the preferred value being about 0.5 to about 5 wt. p.p.m. A preferred mode of operation of the present invention is the continuous introduction of the halogen additive into the reforming; that is it is continuously added without interruption during the process period (i.e., from start-up until shutdown or withdrawal for regeneration). Another preferred practice is not to increase the amount of halogen additive, used during the course of the run, above the value used during start-up of the process.

Although any of the halogen additives known to the catalytic reforming art can be utilized in the present process, ordinarily best results are obtained when the halogen additive is either an elemental halogen such as chlorine gas or a decomposable, halogen-containing compound. More precisely, this latter class of compounds are those that are decomposed at least in part to chloride at the conditions maintained in the reforming zone. Typically, the preferred halogen additives are chlorine or chlorine-containing compounds. Examples of suitable halogen additives are: the hydrogen halides such as hydrogen chloride, hydrogen bromide and hydrogen fluoride; the ammonium halides such as ammonium chloride; the organic halides such as the alkyl and aryl halides and the like compounds. Excellent results are typically obtained with hydrogen chloride or $C_2$ to $C_8$ alkyl chlorides.

It is a preferred feature of the present process that the total amount of water, as its equivalent, continuously entering the reforming zone during the process is maintained in a range corresponding to about 5 to about 50 wt. p.p.m. of the charge stock. Even more preferred is the selection of the amount of halogen additive from the range hereinbefore as a function of the total amount of water or its equivalent charged to the reforming zone so that the mole ratio of water to halogen entering the reforming zone is maintained in the range of about 10:1 to about 100:1, with best results obtained at a mole ratio of about 20:1 to about 60:1. Maintenance of this mole ratio in the stated range is particularly important during start-up of the process. Although it is preferred to continuously maintain the water level in the range previously specified, it is not absolutely essential to do so; in many cases "slugs" of water injected into the reforming zone can be used to move the halogen additive through the catalyst bed, and thus the water level in the reforming zone can be allowed to cycle over a considerable range; however, the average value used during the run should correspond to the preferred amounts previously given. Where water addition is necessary, it can thus be done continuously or intermittently. Essential to the achievement of the stated range of water in the reforming zone are the control of water level present in the charge stock and in the hydrogen stream charged to the reforming zone. In the case where the amount of water entering the zone is greater than desired, the charge stock and/or the hydrogen stream can be dried by using any suitable drying means known to the art such as a conventional solid adsorbent having a high selectivity for water; for instance, sodium or calcium zeolitic crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. In the case where the water level is below the desired range, a suitable water additive can be added to the reforming zone in the necessary amount. Suitable water additives include water and substances that produce water under the conditions maintained in the reforming zone such as alcohols, aldehydes, ketones and the like oxygen-containing organic materials. The preferred water additive is usually an alcohol such as a $C_2$ to $C_8$ alcohol.

In the reforming embodiment, an effluent stream is withdrawn from the reforming zone and passed through a cooling means to a separation zone, typically maintained at about 25 to 100° F. wherein a hydrogen-rich gas is separated from a high octane liquid product, commonly designated as an "unstabilized" reformate. Preferably, at least a portion of this hydrogen-rich gas is withdrawn from the separating zone and then recycled through suitable compressing means back to the reforming zone. The liquid phase from the separating zone is then typically withdrawn and commonly treated in a fractionating system in order to adjust its butane concentration in order to control frontend volatility of the resulting $C_5^+$ reformate.

The pressure utilized in the present process is preferably selected from the range of about 50 p.s.i.g. to about 350 p.s.i.g., although pressures up to 1000 p.s.i.g. can be utilized if desired. In fact, it is a singular advantage of the present invention that it allows stable operation at lower pressures than have heretofore been successfully utilized in so-called "continuous" reforming systems (i.e., reforming for periods of about 15 to about 200 or more barrels of charge per pound of catalyst without regeneration). In other words, this improved bimetallic catalyst allows the operation of a continuous reforming system to be conducted at lower pressure (i.e., 50 to 350 p.s.i.g.) for about the same or better catalyst life before regeneration as has been heretofore realized with conventional all-platinum catalysts at higher pressures (i.e., 400 to 600 p.s.i.g.).

Similarly, the temperature required for reforming is generally lower than that required for a similar reforming operation using a high quality catalyst of the prior art. This significant and desirable feature of the present invention is a consequence of the selectivity of this improved bimetallic catalyst for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for this improved bimetallic catalyst than for a high quality reforming catalyst which is manufactured in exactly the same manner as this improved bimetallic catalyst except for the inclusion of the tin component. Moreover, for a reforming process using this bimetallic catalyst, the $C_5^+$ yield loss for a given temperature increase is substantially lower than for a reforming process using a high quality reforming catalyst of the prior art. In addition, hydrogen production is substantially higher.

The reforming embodiment of the present invention also typically utilizes sufficient hydrogen to provide an amount of about 2 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$, with a value in the range of about 1 to about 5 hr.$^{-1}$ being preferred. In fact, it is a feature of the present invention that, for the same activity or severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

It is intended to cover by the following claims, all changes and modifications of the above disclosure of the present invention that would be self-evident to a man of ordinary skill in the catalytic reforming art.

I claim as my invention:

1. A process for catalytically reforming a gasoline fraction, which process comprises continuously introducing the gasoline fraction, a hydrogen stream and a halogen additive said halogen additive being added in an amount corresponding to about 0.1 to about 100 wt. p.p.m. of said gasoline fraction into a reforming zone and therein contacting the resulting mixture at reforming conditions with a catalytic composite comprising a combination of a platinum group component, a tin component and a halogen component with a porous carrier material, wherein the components are present in amounts sufficient to result in the composite, containing on an elemental basis, about 0.01 to about 2 wt. percent platinum, group metal, about 0.01 to about 5 wt. percent tin and about 0.1 to about 3.5 wt. percent halogen, wherein the tin component is uniformly dispersed throughout the porous carrier material in a particle size which is less than 100 Angstroms in maximum dimension, wherein substantially all of the platinum group component is present as an elemental metal and wherein substantially all of the tin component is present in an oxidation state above that of the elemental metal.

2. A process as defined in Claim 1 wherein the platinum group component of the composite is a platinum metal.

3. A process as defined in Claim 1 wherein the platinum group component of the composite is palladium metal.

4. A process as defined in Claim 1 wherein the platinum group component of the composite is iridium.

5. A process as defined in Claim 1 wherein the porous carrier material is a refractory inorganic oxide.

6. A process as defined in Claim 5 wherein the refractory inorganic oxide is alumina.

7. A process as defined in Claim 1 wherein the halogen component of the composite is chlorine or a compound of chlorine.

8. A process as defined in Claim 1 wherein the tin component is present in the form of tin oxide.

9. A process as defined in Claim 1 wherein the catalytic composite contains, on an elemental basis, about 0.05 to about 0.5 wt. percent sulfur.

10. A process as defined in Claim 1 wherein the halogen additive is elemental halogen.

11. A process as defined in Claim 10 wherein the elemental halogen is chlorine.

12. A process as defined in Claim 1 wherein the halogen additive is a decomposable, halogen-containing compound.

13. A process as defined in Claim 12 wherein the halogen-containing compound is a hydrogen halide.

14. A process as defined in Claim 13 wherein the hydrogen halide is hydrogen chloride.

15. A process as defined in Claim 13 wherein the halogen-containing compound is an alkyl halide.

16. A process as defined in Claim 1 wherein the halogen additive is added continuously to the reforming zone throughout the duration of the contacting step.

17. A process as defined in Claim 16 wherein the amount of the halogen additive charged to the reforming zone is not increased during the course of the run from the value used during the startup of the process.

18. A process as defined in Claim 1 wherein water or water-producing compounds is charged to the zone and wherein the amount of halogen additive is selected from the stated range as a function of the total amount of water or its equivalent charged to the reforming zone so that the mole ratio of water entering the zone to halogen additive entering the zone is maintained in the range of about 10:1 to about 100:1.

References Cited
UNITED STATES PATENTS

| | | | |
|---|---|---|---|
| 3,745,112 | 7/1973 | Rausch | 208—139 |
| 2,969,319 | 1/1961 | Sosnowski et al. | 208—139 |
| 2,642,384 | 6/1953 | Cox | 208—139 |
| 3,649,524 | 3/1972 | Derr et al. | 208—139 |

HERBERT LEVINE, Primary Examiner